2,806,793

PROCESS FOR THE TREATMENT OF MEAT WITH A SALT SOLUTION

Andreas Waltherus Wilhelmus Kemps, Oss, Netherlands, assignor to N. V. Fijne Vleeschwaren-en Conservenfabrieken van Anton Hunink, Deventer, Netherlands No Drawing. Application February 3, 1953, Serial No. 334,983

Claims priority, application Netherlands February 4, 1952

2 Claims. (Cl. 99—159)

The invention relates to a process for the treatment of meat with a salt solution.

For several purposes meat is salted, so soaked in an aqueous sodium chloride solution. If the meat to be treated is held in this solution during some time, the cells are filled with sodium chloride solution in consequence of the osmotic working. The salted meat can be used for several purposes, whereby the previously salted meat is smoked. By salting the keeping qualities of the meat are very much improved and also the hardness becomes larger.

According to the invention the meat is treated in an aqueous solution of one or more salts, which solution is free or practically free of Na-ions. Therefore the new process relates to an essential other method of salting. Smoked beef, being salted with sodium chloride in the known manner, may not be consumed by certain patients, especially those with renal diseases.

It appeared, that very tasty smoked beef can be prepared by treating the meat before smoking with Na-ions-free solutions. In practice there has been determined, that two smoked meat products, of which one has been treated with a sodium chloride solution and the other according to the invention with a solution being free of Na-ions, have nearly the same taste.

The method according to the invention can also be applied with other than smoked meat products, e. g. dried or salted meat products. The salts to be added according to the invention can also be solved in the cell-liquid of the meat products in order to prepare the salt solution. The salt solution can also be brought in the meat under pressure.

Very good results are obtained with an ammonium salt, e. g. ammonium chloride. In practice ammonium salts has advantages over potassium salts, as the human organism is considered to tolerate potassium salts less good.

In order to improve, if desired, the taste of the meat a quantity of sugar can be added to the solution, owing to which under circumstances the colour of the meat product is improved. Improvement of the colour can, in a known manner, further be obtained with a nitrate or a nitrite, such as potassium nitrate.

In order to obtain the desired taste-effects spices and flavouring matters can be added to the meat products.

The process according to the invention can e. g. be performed as follows:

When a piece of meat of 440 gr. has been in the treating liquid during 44 hours it is sufficiently hard to be smoked. The treating liquid contains pro liter water 80 g. $NH_4Cl$, 100 g. sugar and 0.6 g. $KNO_3$.

I claim:

1. A method of curing meat comprising subjecting the same to the action of a pickling liquor which is free from sodium chloride and which contains 80 g. of ammonium chloride as the inorganic chloride preserving agent per liter of water.

2. A method as in claim 1 wherein said pickling liquor contains 100 g. sugar per liter of water.

References Cited in the file of this patent

UNITED STATES PATENTS

| | | |
|---|---|---|
| 1,212,614 | Doran | Jan. 16, 1917 |
| 1,259,376 | Doran | Mar. 12, 1918 |
| 2,241,030 | Hess | May 6, 1941 |
| 2,461,291 | McKee | Feb. 8, 1949 |
| 2,601,112 | Freedman | June 17, 1952 |
| 2,688,555 | Komarik et al. | Sept. 7, 1954 |